US012621666B2

(12) United States Patent
Boisset et al.

(10) Patent No.: US 12,621,666 B2
(45) Date of Patent: May 5, 2026

(54) METHOD FOR AUTHENTICATING A CENTRAL UNIT CONNECTED TO PERIPHERAL UNITS USING A SECURE SERVER

(71) Applicant: Continental Automotive Technologies GmbH, Hannover (DE)

(72) Inventors: Jean-Philippe Boisset, Montauban (FR); Nicolas Guinart, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/838,723

(22) PCT Filed: Apr. 21, 2023

(86) PCT No.: PCT/EP2023/060421
§ 371 (c)(1),
(2) Date: Aug. 15, 2024

(87) PCT Pub. No.: WO2023/208761
PCT Pub. Date: Nov. 2, 2023

(65) Prior Publication Data
US 2025/0159479 A1     May 15, 2025

(30) Foreign Application Priority Data

Apr. 27, 2022     (FR) ...................................... 2203920

(51) Int. Cl.
*G06F 15/16*          (2006.01)
*B60C 23/04*          (2006.01)
(Continued)

(52) U.S. Cl.
CPC ....... *H04W 12/069* (2021.01); *B60C 23/0479* (2013.01); *H04W 12/009* (2019.01); *H04W 12/033* (2021.01)

(58) Field of Classification Search
CPC ............. H04W 12/069; H04W 12/009; H04W 12/033; H04W 4/38; H04W 4/40;
(Continued)

(56) References Cited

U.S. PATENT DOCUMENTS 7,042,348 B2 *  5/2006  Schulze .............. B60C 23/0408
                                                         340/447
9,420,408 B2 *  8/2016  Liu ......................... H04W 4/80
(Continued)

FOREIGN PATENT DOCUMENTS

CN          110808829 A      2/2020
DE    202014011598 U1 *     2/2023   ........... G01C 21/166
(Continued)

OTHER PUBLICATIONS

International Search Report (PCT/ISA/210) and Written Opinion (PCT/ISA/237) with translation mailed on May 25, 2023 by the European Patent Office as the International Searching Authority for International Application No. PCT/EP2023/060421. (25 pages).
(Continued)

*Primary Examiner* — Hamza N Algibhah
(74) *Attorney, Agent, or Firm* — Buchanan Ingersoll & Rooney PC

(57)          ABSTRACT

A method for authenticating a central unit communicating with peripheral units performing measurements, using a server device, each peripheral unit generates a shared encryption key, the server device generates a temporary session key and the same shared encryption key, then performs a first encryption in order to form a first shared dynamic encryption key, then performs a second encryption with the identifier of the central unit in order to give an encrypted central-unit information item as proof of authentication transmitted to the peripheral unit, the peripheral unit performs a reverse decryption in order to obtain the tempo-
(Continued)

rary session key, and an encryption with the central-unit identifier and the shared encryption key in order to give an encrypted identifier which is compared with the received encrypted central-unit information item in order to grant its authentication.

9 Claims, 3 Drawing Sheets

(51) Int. Cl.

| | | |
|---|---|---|
| *G06F 9/54* | (2006.01) | |
| *H04L 29/06* | (2006.01) | |
| *H04W 12/00* | (2021.01) | |
| *H04W 12/033* | (2021.01) | |
| *H04W 12/069* | (2021.01) | |

(58) Field of Classification Search

CPC .............. H04W 12/71; H04W 12/041; H04W 12/0431; H04W 84/18; B60C 23/0479; B60C 23/0462; B60C 23/0461; H04L 63/062; H04L 63/0435; H04L 63/00; H04L 63/083

USPC .......................................................... 726/23

See application file for complete search history.

(56) References Cited

U.S. PATENT DOCUMENTS

| | | | | |
|---|---|---|---|---|
| 9,608,808 | B2 * | 3/2017 | Murakami | ............ H04W 12/06 |
| 9,796,219 | B2 * | 10/2017 | Chong | ................ B60C 23/0479 |
| 10,245,904 | B1 * | 4/2019 | Van Wiemeersch | .........................  H04W 12/106 |
| 11,110,759 | B2 | 9/2021 | Huard et al. | |
| 12,305,999 | B2 * | 5/2025 | Teramoto | ........... G01C 21/3697 |
| 12,317,082 | B2 * | 5/2025 | McGrotty | ............... H04W 4/80 |
| 2012/0191971 | A1 | 7/2012 | Battistello et al. | |
| 2019/0180401 | A1 * | 6/2019 | Kobayashi | .............. B60R 25/24 |
| 2019/0184775 | A1 | 6/2019 | Van Wiemeersch et al. | |
| 2020/0159251 | A1 * | 5/2020 | Iwasaki | .................... H04N 5/74 |
| 2021/0233195 | A1 * | 7/2021 | Kobayashi | ............. G06Q 10/08 |
| 2024/0270029 | A1 * | 8/2024 | Justin | ................. B60C 23/0479 |

FOREIGN PATENT DOCUMENTS

| | | | | | |
|---|---|---|---|---|---|
| FR | 3084310 | A1 | | 1/2020 | |
| KR | 20180019251 | A | * | 2/2018 | .............. H04W 8/02 |
| KR | 20190040443 | A | | 4/2019 | |
| KR | 102077659 | B1 | * | 4/2020 | ........ G06Q 20/3829 |
| KR | 102847992 | B1 | * | 8/2025 | ........ B60C 23/0479 |
| WO | 2011039460 | A2 | | 4/2011 | |
| WO | WO-2022173486 | A1 | * | 8/2022 | ........ H04W 12/0471 |

OTHER PUBLICATIONS

Notification of the RRP with Obligation to Respond with translation mailed on Nov. 14, 2022 by the French Patent Office in corresponding French Patent Application No. FR2203920. (64 pages).

* cited by examiner

METHOD FOR AUTHENTICATING A CENTRAL UNIT CONNECTED TO PERIPHERAL UNITS USING A SECURE SERVER

CROSS REFERENCE TO RELATED APPLICATIONS

This application is the U.S. National Phase Application of PCT International Application No. PCT/EP2023/060421, filed Apr. 21, 2023, which claims priority to French Patent Application No. 2203920, filed Apr. 27, 2022, the contents of such applications being incorporated by reference herein.

FIELD OF THE INVENTION

The present invention relates to a method for authenticating the rights of a central unit to communicate with peripheral units fixed to the wheels of a motor vehicle using a secure server connected by an Internet connection, in order to carry out sensitive operations on these peripheral units, as well as units and a motor vehicle comprising devices implementing this method.

BACKGROUND OF THE INVENTION

One type of method of communication between a tire-pressure monitoring system (TPMS) of a motor vehicle and a smart device of a user of this vehicle, presented notably by the document FR-A1-3084310, incorporated herein by reference, comprises a peripheral unit installed on each wheel of the vehicle measuring parameters such as the inflation pressure and the temperature of the tire, which are transmitted at radio frequency, in particular using the Bluetooth standard, to a central unit arranged in the vehicle receiving information in order to process it and inform the driver or a repairer in order to alert them in the event that a problem is detected.

In particular, the wheel units periodically transmit information to the central unit, using a specific unique identifier which makes it possible to identify the wheel concerned. Each wheel unit also possesses a wave receiver receiving signals from the central unit, in order to perform diagnostic, configuration or training operations on this wheel unit.

The method exhibits the use of waves at ultra high frequency (UHF), exceeding one gigahertz, making it possible to offer new applications such as exchanging with devices which are external to the vehicle, notably a smartphone of the user.

Moreover, generally, in the case of a system carrying out radiofrequency exchanges between a central unit of a user or client and peripheral units recording data, for example for these tire-pressure monitoring systems, it may be necessary to perform sensitive operations on these peripheral units, such as reprogramming them, using the Internet and cloud-computing services.

Each unit possesses, as an identifier, a specific medium access control (MAC) address stored in a physical memory. The authentication of the central unit of the user by the peripheral units for carrying out sensitive operations such as reprogramming thereon poses problems for, in a simple way, without loading the server with exchanges of large volumes of data, ensuring a high level of security in order to avoid undesirable interventions by third parties such as piracy, and the confidentiality of the data exchanges.

A notable aim of the present invention is to avoid these problems of the prior art.

SUMMARY OF THE INVENTION

It proposes, to this end, a method for authenticating the rights of a central unit of a user for communicating bidirectionally at radio frequency with one or more peripheral units fixed to the wheels of a motor vehicle which transmit raw measurement data consisting of measurements performed on the tires of the vehicle which they acquire, each central unit and peripheral unit possessing a specific identifier, this method using, over the Internet, an external server device comprising at least one secure server, comprising a link by a secure connection between them in the case of several servers, and possessing, in a database, the identifier of the peripheral units, this method being noteworthy in that it comprises the following successive steps:

in a first step the central unit uses its identifier and a password to get itself recognized by each peripheral unit which generates a symmetric shared random encryption key, and in parallel the central unit establishes a secure connection with the server device, authenticating so that it recognizes, in its database, the identifier of the peripheral unit concerned;

in a second step the server device generates a dynamic temporary session key;

in a third step the server device generates the same symmetric shared encryption key on the basis of the identifier of the peripheral unit, then performs a first encryption with this shared encryption key and with the dynamic temporary session key in order to form a first shared dynamic encryption key, then performs a second encryption using the identifier of the central unit, and the symmetric shared encryption key or the dynamic temporary session key, in order to give an encrypted central-unit information item which is a proof of authentication;

in a fourth step the shared dynamic encryption key and the encrypted central-unit information item are transmitted to the central unit, which transmits them, in its turn, to the peripheral unit;

the peripheral unit performs, in a fifth step, a decryption which is the reverse of the first encryption, performed by the server device in its third step, with its shared encryption key and the shared dynamic encryption key, in order to obtain the dynamic temporary session key; and the peripheral unit performs, in parallel in a sixth step, an encryption with its shared encryption key and the central-unit identifier in order to give a second encrypted information item, then compares this second encrypted information item with the received encrypted central-unit information item in order, if they coincide, to grant its authentication to this central unit.

One advantage of the authentication method according to an aspect of the invention is that it makes it possible to simplify the procedure for encrypting the source files stored in the server in order to avoid this server being overloaded, the encrypted files being created only once for all the peripheral units.

The method for authenticating rights according to an aspect of the invention may further comprise one or more of the following features, which may be combined with one another.

According to one embodiment, the peripheral unit performs, in a following step, an encryption of raw data to be transmitted with the dynamic temporary session key, in order to form encrypted data transmitted to the central unit, which transmits them, in its turn, to the server device.

According to another embodiment, the peripheral unit performs, in a following step, an encryption of the raw data to be transmitted with the shared dynamic encryption key, in order to form encrypted data transmitted to the central unit, which then carries out a decryption in order to obtain the raw data, with the shared dynamic encryption key which this central unit kept in memory.

The server device may comprise a single server which is secure, carrying out the second step, of generating the dynamic temporary session key, and the third step, of generating the shared dynamic encryption key then the encrypted central-unit information item forming the proof of authentication.

As a variant, the server device may comprise a first server possessing, in a database, the identifier of the peripheral unit and comprise the secure server possessing, in a database, the shared encryption key.

In this case, the first server advantageously carries out the second step, of generating the dynamic temporary session key, then transmits this dynamic temporary session key and the identifier of the central unit to the secure server.

In addition, the secure server advantageously then carries out the third step, of generating the shared dynamic encryption key, then the encrypted central-unit information item forming the proof of authentication.

Another aspect of the invention is a system comprising a central unit, and peripheral units fixed to the wheels of a motor vehicle carrying out measurements on the tires of the wheels of the vehicle forming raw data, connected to one another at radio frequency, which is noteworthy in that it comprises devices implementing a method comprising any one of the preceding features.

An additional aspect of the invention is a motor vehicle comprising a central unit, and peripheral units fixed to the wheels of the motor vehicle carrying out measurements on the tires of the wheels of this vehicle forming raw data, which is noteworthy in that it comprises devices implementing a method comprising any one of the preceding features.

DETAILED DESCRIPTION OF EXEMPLARY EMBODIMENTS

Figure 1:
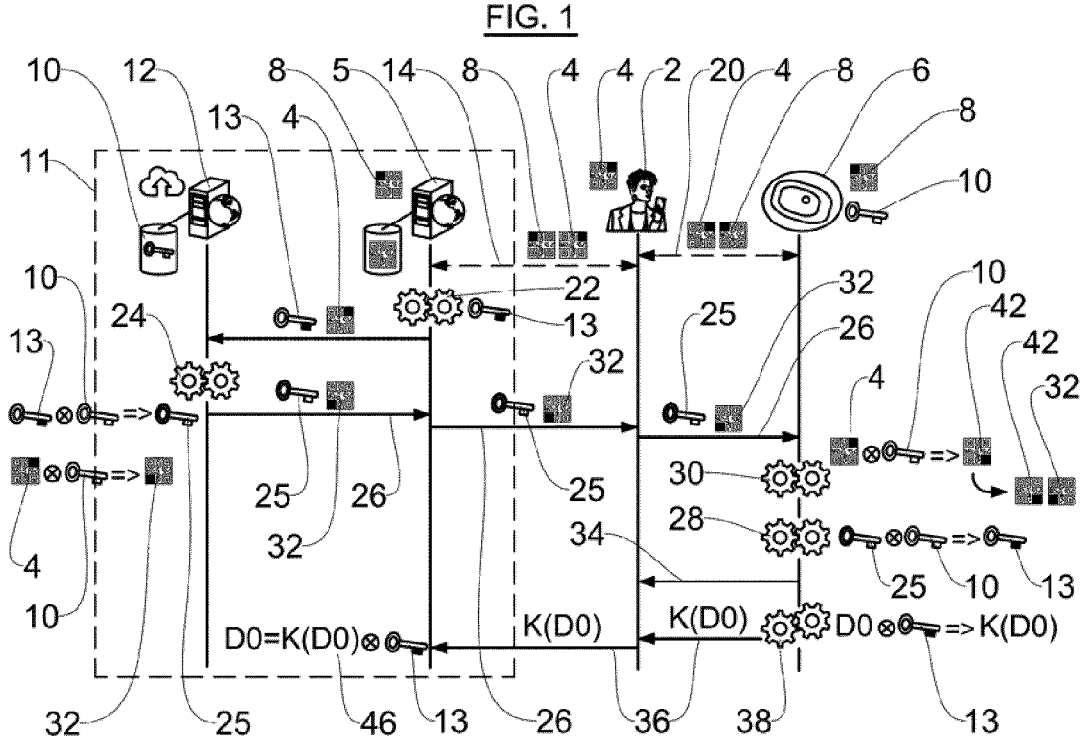
FIG. 1 is a block diagram presenting a method according to an aspect of the invention for authenticating a central unit arranged in a motor vehicle, connected to peripheral units fixed to the wheels of the vehicle, using two servers.

FIG. 1 presents, in a motor vehicle, a central unit 2 forming a client having a central-unit identifier 4 and, on each wheel, a peripheral unit 6 comprising sensors of the pressure and of the temperature of the tire of the wheel, having a peripheral-unit identifier 8 and a specific symmetric shared encryption key 10 which are recorded when this unit is manufactured. The central unit 2 and the peripheral units 6 communicate with one another notably using the Bluetooth® standard.

The Internet 14, using a radiofrequency link, makes it possible to connect the central unit 2 to an external server device 11 comprising a first server 5 possessing, in a database, the identifier 8 of the peripheral unit, and a second secure server 12 possessing, in a database, the shared symmetric encryption key 10 of this peripheral unit.

In particular, the first server 5 may be that of a manager of the fleet of vehicles or of the automobile maker wishing to monitor their vehicles which are in circulation, directly receiving information from the central unit 2, in order to exchange with the second secure server 12, which may be that of the tire manufacturer wishing to monitor the evolution of their manufactured tires.

The method for authenticating the central unit 2, which makes it possible to exchange with the peripheral units 6 and to carry out sensitive operations thereon, comprises a first step 20 of using the identifier 4 of the central unit 2 and a password in order to get itself recognized by the specific peripheral unit 6, and accept the connection.

In parallel the central unit 2 is connected, by a secure connection 14, to the first server 5 in order to use its identifier 4 and that 8 of the peripheral unit 6, in order for it to recognize, in its database, the identifier of the specific unit 6 concerned. A Hypertext Transfer Protocol Secure (HTTPS) connection is advantageously used, taking, for example, the identifier 4 of the central unit 2 and a password.

In a second step 22 the first server 5 generates a dynamic temporary session key 13, which is transmitted, with the identifier 4 of the central unit 2, to the second server 12.

In a third step 24 the second server 12 generates the same symmetric shared encryption key 10 on the basis of the identifier 8 of the peripheral unit 6, then performs a first encryption with this symmetric shared encryption key 10 and with the dynamic temporary session key 13, in order to form a first dynamic encryption key 25. The second server 12 then performs a second encryption with the identifier 4 of the central unit 2 and the symmetric shared encryption key 10, in order to give an encrypted central-unit information item 32 which constitutes a proof of authentication of the central unit 2.

In a fourth step 26 the second server 12 transmits the dynamic encryption key 25 and the encrypted central-unit information item 32 to the first server 5, which transmits them, in its turn, to the central unit 2, this central unit then transmitting them to the peripheral unit 6.

In a fifth step 28 the peripheral unit 6 performs a decryption which is the reverse of the first encryption, performed by the second server 12 in the third step 24, using its shared encryption key 10 and the dynamic encryption key 25 in order to obtain the dynamic temporary session key 13.

In a sixth step 30 the peripheral unit 6 performs, in parallel with the fifth step 28, an encryption using the identifier 4 of the central unit 2 and its shared encryption key 10 in order to give a second encrypted information item 42. The peripheral unit 6 then compares this second encrypted information item 42 with the encrypted central-unit information item 32 coming from the second server 12 in order, if they coincide, to grant its authentication 34 to the central unit 4.

The peripheral unit 6 performs, in a following seventh step 38, an encryption of the raw data D0 to be transmitted consisting of measurements performed on the tire, with the dynamic temporary session key 13, in order to form encrypted data K(D0) transmitted, in the step 36, to the central unit 2, which transmits them, in its turn, to the first server 5. In a following step 46 the first server 5 carries out, with the dynamic temporary session key 13, a decryption of the encrypted data K(D0) in order to obtain the raw data D0.

With this method the central unit 2 may subsequently give this proof again to the peripheral unit 6 without the aid of the server 12, only during the same communication session with this peripheral unit. In this way an outside person wanting to pirate the system by seeking to connect during the following session will not be capable of giving this proof again and will not be able to pass themselves off as the client.

Figure 2:
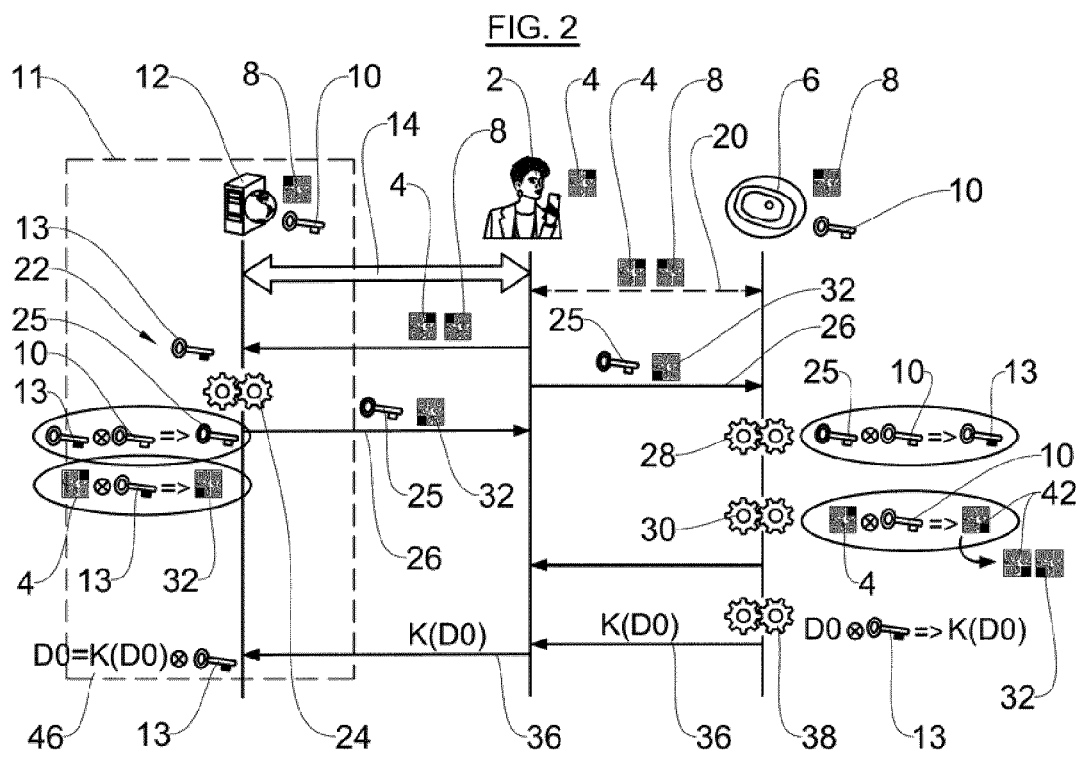
FIG. 2 is a block diagram presenting the method using a single server.

FIG. 2 presents a similar method for an external server device 11 comprising a single secure server 12 possessing the identifier 8 of the peripheral unit 6 and the corresponding symmetric shared encryption key 10.

In this case the single secure server 12 carries out the second step 22, which generates the dynamic temporary session key 13.

The server 12 then carries out the third step 24, comprising the first encryption, which uses the symmetric shared encryption key 10 and the dynamic temporary session key 13 to form the first dynamic encryption key 25, then the second encryption, which uses the identifier 4 of the central unit 2 and the dynamic temporary session key 13 to give the encrypted central-unit information item 32 constituting the proof of authentication of the central unit 2.

Then, as for FIG. 1, the encrypted central-unit information item 32 is transmitted to the central unit 2 then to the peripheral unit 6, this peripheral unit likewise carrying out the fifth step 28 and the sixth step 30 of validating the authentication, then the seventh step 38 of encrypting with the dynamic temporary session key 13 and of transmitting the raw data D0 to the central unit 2 then to the secure server 12, which decrypts them.

Figure 3:
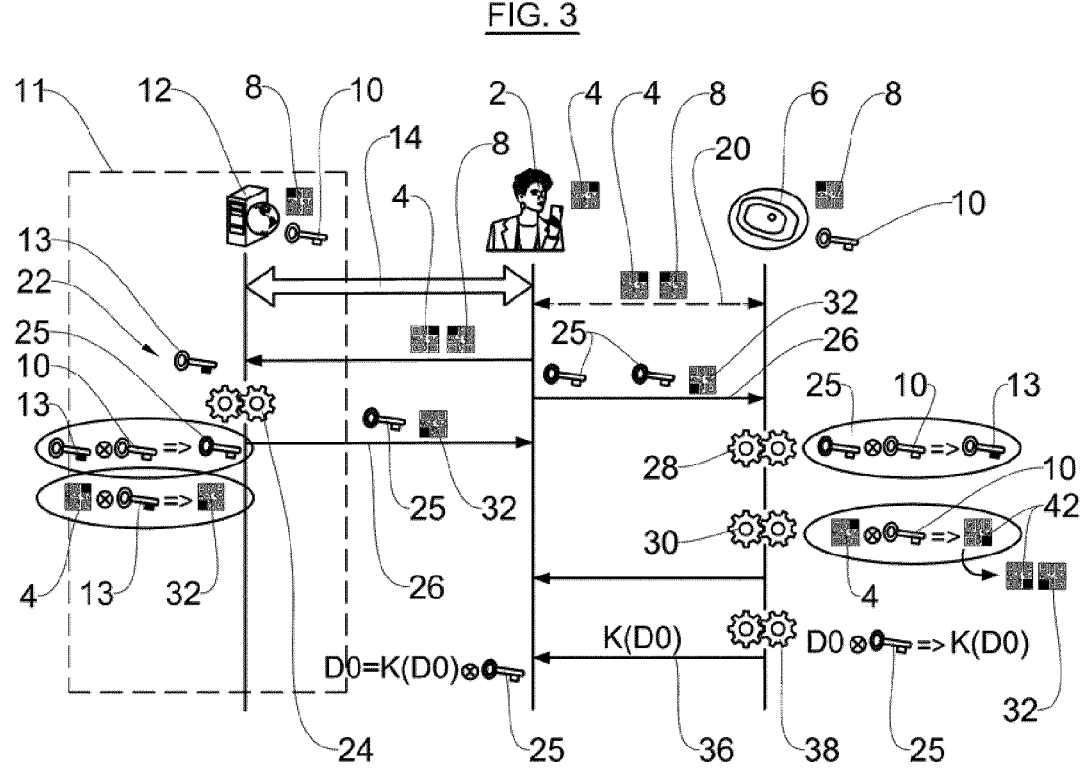
FIG. 3 is a block diagram presenting the method using a single server, according to a variant.

FIG. 3 presents a method similar to that of FIG. 1 with two servers or of FIG. 2 with a single server, comprising, by way of difference, after the central unit 2 has been authenticated, the operation 38 of encrypting the raw data D0 which is carried out by the peripheral unit 6, which uses the first dynamic encryption key 25 instead of the dynamic temporary session key 13.

The central unit 2, which retained the first dynamic encryption key 25, may then itself carry out the operation of decrypting the encrypted data K(D0) in order to obtain the raw data D0, using this first encryption key.

Advantageously, the encryptions and decryptions are performed with AES (Advanced Encryption Standard)—128.

The authentication method according to an aspect of the invention is particularly suitable for monitoring tires of a motor vehicle, in order to report faults to the user or to a repairer or to prevent them. It also makes it possible for automobile makers or for tire manufacturers to receive information over an external server in order to monitor their products and in order to improve the quality.

The invention claimed is:

1. A method for authenticating rights of a central unit of a user device for communicating bidirectionally at radio frequency with one or more peripheral units fixed to wheels of a motor vehicle which transmit raw measurement data consisting of measurements performed on tires of the vehicle which the one or more peripheral units acquire, each of the central unit and each of the one or more peripheral units possessing a specific identifier, this method using, over the Internet, an external server device comprising at least one secure server, comprising a secure connection between a plurality of the at least one secure server, and possessing, in a database, the identifier of the peripheral units, the method comprising the following successive steps:

the central unit uses its identifier and a password to get itself recognized by each peripheral unit, each peripheral unit generates a symmetric shared random encryption key, and in parallel, the central unit establishes a secure connection with the server device, authenticating so that the server recognizes, in the server database, the specific identifier of the peripheral unit;

the server device generates a dynamic temporary session key;

the server device generates an encryption key which is the same as the symmetric shared encryption key on the basis of the identifier of the peripheral unit, then performs a first encryption with this shared encryption key and with the dynamic temporary session key in order to form a first shared dynamic encryption key, then performs a second encryption using the identifier of the central unit, and the symmetric shared encryption key or the dynamic temporary session key, in order to give an encrypted central-unit information item which is a proof of authentication;

the shared dynamic encryption key and the encrypted central-unit information item are transmitted to the central unit, which transmits them, in its turn, to the peripheral units;

the one or more peripheral unit perform a decryption which is the reverse of the first encryption, performed by the server device in its third step, with the shared encryption key and the shared dynamic encryption key, in order to obtain the dynamic temporary session key; and the one or more peripheral unit perform, in parallel, an encryption with its shared encryption key and the central-unit identifier in order to give a second encrypted information item, then compares this second encrypted information item with the received encrypted central-unit information item in order, if they coincide, to grant its authentication to this central unit.

2. The method as claimed in claim 1, wherein the peripheral unit performs, in a following step, an encryption of the raw data to be transmitted with the dynamic temporary session key, in order to form encrypted data transmitted to the central unit, which transmits them, in its turn, to the server device.

3. The method as claimed in claim 1, wherein the peripheral unit performs, in a following step, an encryption of the raw data to be transmitted with the shared dynamic encryption key, in order to form encrypted data transmitted to the central unit, which then carries out a decryption in order to obtain the raw data, with the shared dynamic encryption key which this central unit kept in memory.

4. The method as claimed in claim 1, wherein the server device comprises a single server which is secure, carrying out the second step of generating the dynamic temporary session key, and the third step, of generating the shared dynamic encryption key then the encrypted central-unit information item forming the proof of authentication.

5. The method as claimed in claim 1, wherein the server device comprises a first server possessing, in a database, the identifier of the peripheral unit and comprises the secure server possessing, in a database, the shared encryption key.

6. The method as claimed in claim 5, wherein the first server carries out the second step, of generating the dynamic temporary session key, then transmits this dynamic temporary session key and the identifier of the central unit to the secure server.

7. The method as claimed in claim 6, wherein the secure server then carries out the third step, of generating the shared dynamic encryption key, then the encrypted central-unit information item forming the proof of authentication.

8. A system comprising a central unit, and peripheral units fixed to the wheels of a motor vehicle carrying out measurements on the tires of the wheels of the vehicle forming raw data, connected to one another at radio frequency, comprising devices implementing a method as claimed claim 1.

9. A motor vehicle comprising a central unit, and peripheral units fixed to the wheels of the motor vehicle carrying out measurements on the tires of the wheels of this vehicle forming raw data, comprising devices implementing a method as claimed in claim 1.

\* \* \* \* \*